United States Patent [19]

Schneider

[11] Patent Number: 5,782,595
[45] Date of Patent: Jul. 21, 1998

[54] ASSEMBLY UNIT COMPRISED OF AN ASSEMBLY ELEMENT AND A FASTENING ELEMENT

[75] Inventor: Wilhelm Schneider, Rednitzhembach, Germany

[73] Assignee: Richard Bergner GmbH & Co., Schwabach, Germany

[21] Appl. No.: 769,327

[22] Filed: Dec. 19, 1996

[30] Foreign Application Priority Data

Dec. 23, 1995 [DE] Germany ............ 195 48 773.7

[51] Int. Cl.$^6$ ............... F16B 21/18; F16B 39/00
[52] U.S. Cl. ............ 411/352; 411/353; 411/107; 411/537; 411/999
[58] Field of Search ............... 411/107, 108, 411/84, 352, 353, 537, 970, 999

[56] References Cited

U.S. PATENT DOCUMENTS

| 2,403,541 | 7/1946 | Molat ................ 411/537 |
| 3,465,803 | 9/1969 | Ernest et al. ........ 411/999 |
| 4,732,519 | 3/1988 | Wagner .............. 411/107 X |
| 5,244,325 | 9/1993 | Knohl ............... 411/353 |
| 5,462,395 | 10/1995 | Damm et al. ........ 411/353 X |

FOREIGN PATENT DOCUMENTS

| 34 30 296 | 2/1986 | Germany . |
| 90 16 087 | 5/1991 | Germany . |
| 41 31 779 | 3/1993 | Germany . |
| 95/21335 | 8/1995 | WIPO . |

Primary Examiner—Neill R. Wilson
Attorney, Agent, or Firm—Spencer & Frank

[57] ABSTRACT

An assembly unit includes an assembly element having a wall bounding a through hole thereof; and a counterpart back engagement part protruding radially inwardly from the wall and into the through hole. The assembly unit further includes a fastening element to be inserted into the through hole for assuming an initial position and a final assembly position therein, having a head for actuating a fastening of the fastening element; a shaft disposed adjacent the head for resting with radial play in the through hole, the shaft resting entirely in the through hole in the final assembly position of the fastening element; and a back engagement part disposed on the shaft and having a cross section in a plane perpendicular to a longitudinal axis of the shaft which protrudes beyond a cross section of the shaft in the plane. The shaft defines an undercut region between the head and the back engagement part. When the shaft rests in the through hole, the counterpart back engagement protrudes toward the undercut region and cooperates with the back engagement part to captively retain the fastening element in the through hole. The undercut region defines a constriction therein positioned such that, in the final assembly position of the fastening element, the constriction is disposed, in a radial direction, adjacent the counterpart back engagement part.

10 Claims, 5 Drawing Sheets

5,782,595

1

ASSEMBLY UNIT COMPRISED OF AN ASSEMBLY ELEMENT AND A FASTENING ELEMENT

FIELD OF THE INVENTION

The invention relates to an assembly unit which includes an assembly element defining a through hole therein and having a wall bounding the through hole; and a counterpart back engagement part protruding radially inwardly from the wall and into the through hole. The assembly unit further includes a fastening element configured to be inserted into the through hole of the assembly element for assuming an initial position and a final assembly position therein. The fastening element includes: a head for actuating a fastening of the fastening element for placing the fastening element in its final assembly position for fastening the assembly element to a workpiece; a shaft disposed adjacent the head for resting with radial play in the through hole of the assembly element, the shaft resting entirely in the through hole of the assembly element in the final assembly position of the fastening element; and a back engagement part disposed on the shaft and having a cross section in a plane perpendicular to a longitudinal axis of the shaft which protrudes beyond a cross section of the shaft in the plane. The shaft defines an undercut region between the head and the back engagement part of the fastening element. When the shaft rests in the through hole the counterpart back engagement protrudes toward the undercut region of the shaft and cooperates with the back engagement part to captively retain the fastening element in the through hole.

BACKGROUND OF THE INVENTION

Examples of such assembly units are housing caps, for instance, which are mounted on a workpiece, such as a cylinder head or the like, with a plurality of fastening elements, typically screws. The trend in assembly technology is toward the greatest possible degree of prefabrication. Although previously, screws were not inserted until final assembly of an assembly element, such as a housing cap, for instance, today the demand is that this assembly element, when shipped to a customer, already have the necessary fastening screws combined into an assembly unit for final assembly. Final assembly can then be done comparatively quickly, and optionally automatically by means of a robot. In such an assembly unit, it must be assured that the fastening elements or screws are securely connected to the assembly element, to prevent their being lost during shipment or transport. It must also be assured that the fastening ends of the fastening elements, or in other words the thread in the case of screws, remain undamaged between the preassembly and the final assembly. This pertains particularly to transporting and storage of the assembly elements equipped with the fastening elements. To that end, the fastening elements are movable axially in the assembly element between an assembly position, in which the fastening elements protrude from out of the assembly element from their fastening end, and a preassembly position, in which the fastening ends of the fastening elements rest inside the assembly element. To create fastening of the fastening elements in their preassembly position, the fastening elements, which will hereinafter for simplicity be called screws, have a back-engagement part on their shaft that protrudes beyond the shaft cross section. A counterpart back-engagement part, which protrudes radially inward from the wall of the through hole of the assembly element, protrudes into the undercut region that extends from the back-engagement part to the head of the screw.

2

One substantial problem in such assembly units arises if the threaded bores, in a workpiece or machine part on which an assembly unit is to be mounted, are not exactly aligned with the axes of the through holes of the assembly element. Such an axial offset between the through holes of the assembly element and the corresponding nut thread must—if it exists—be compensated for both when the screws are screwed into the workpiece and in the final assembled state. This is possible, however, only to the extent that the screw, when its screw thread engages the nut thread, can align itself essentially axially parallel to the aforementioned nut thread. Aligning the screw and the nut thread during the screwing-in operation is possible in principle, since the screw thread and the nut thread as a rule have some play relative to one another, which play continues to exist until the moment that the screws are tightened firmly, or in the final assembled state. In the final assembled state, however, the aforementioned alignment capability is limited by the back-engagement part that protrudes radially inward from the wall of the through holes in the assembly element and cooperates with the shaft circumference.

SUMMARY OF THE INVENTION

With the above as the point of departure, the object of the invention is to propose an assembly unit in which in the event of an axial offset, the possibility of aligning a screw in the final assembled state is improved.

This object is attained by an assembly unit includes an assembly element defining a through hole therein and having a wall bounding the through hole; and a counterpart back engagement part protruding radially inwardly from the wall and into the through hole. The assembly unit further includes a fastening element configured to be inserted into the through hole of the assembly element for assuming an initial position and a final assembly position therein. The fastening element includes: a head for actuating a fastening of the fastening element for placing the fastening element in its final assembly position for fastening the assembly element to a workpiece; a shaft disposed adjacent the head for resting with radial play in the through hole of the assembly element, the shaft resting entirely in the through hole of the assembly element in the final assembly position of the fastening element; and a back engagement part disposed on the shaft and having a cross section in a plane perpendicular to a longitudinal axis of the shaft which protrudes beyond a cross section of the shaft in the plane. The shaft defines an undercut region between the head and the back engagement part of the fastening element. When the shaft rests in the through hole, the counterpart back engagement protrudes toward the undercut region of the shaft and cooperates with the back engagement part to captively retain the fastening element in the through hole. The undercut region of the shaft defines a constriction therein positioned such that, in the final assembly position of the fastening element, the constriction is disposed, in a radial direction, adjacent the counterpart back engagement part of the assembly element.

According to the invention, a constriction is present in the undercut region of the screw shaft, and the constriction is positioned in the axial direction in such a way that in the final assembly position of the screw, it is disposed radially next to the counterpart back-engagement part of the assembly element. During the screwing-in operation, because of the play between the threads of the screw and the nut, a certain canted position of the screw is still possible, so that despite any axial offset between the axis of the through hole in the assembly element and the axis of the nut thread, the screw can still be screwed in. Once the screw is firmly tightened, however, it is aligned coaxially with the center longitudinal axis of the nut thread. The axial offset then makes itself fully apparent accordingly. However, since the counterpart back-engagement parts of the through hole can engage the constriction on the screw shaft, any axial offset that may be present can be compensated for to a greater extent that was previously possible.

Another substantial additional effect of the assembly unit according to the invention is that the through hole of the assembly element can be equipped with a space-saving smaller diameter, without impairing the possibility of compensation for any axial offset. As a result, the mounting flange of a housing cap, for instance, in which the aforementioned through holes are disposed can be made narrower.

According to one aspect of the invention, the construction has a cross section in the plane perpendicular to the longitudinal axis of the shaft which is configured for receiving an entirety of the counterpart back engagement part therein. The above arrangement ensures that the counterpart back-engagement part of the through hole is received entirely by the constriction. As a result, the extent of the radially axially parallel deviation of the screw shaft from its desired position, in which position it is aligned coaxially with the hole axis, is increased and accordingly the capability of compensating for any axial offset is improved.

The capability of compensating for an axial offset according to the invention can also be applied to assembly elements in which the wall of the through hole is formed not by the assembly element itself but rather by a sleeve that surrounds the shaft of the screw or fastening element.

For the mode of operation according to the invention of an assembly unit, it does not matter how the back-engagement parts are made on both the shaft and the hole wall of an assembly element or sleeve. Nor does it matter in what order over time the back-engagement parts are made. It is thus conceivable for instance that the back-engagement part on the shaft of the fastening element is made first, and the corresponding counterpart back-engagement part on the assembly element or on a sleeve is made while the screw is being inserted into the through hole in the sleeve or assembly element, or thereafter.

BRIEF DESCRIPTION OF THE DRAWINGS

The invention will now be described in further detail in terms of exemplary embodiments shown in the drawings. Shown are in.

DETAILED DESCRIPTION OF THE INVENTION

Figure 1:
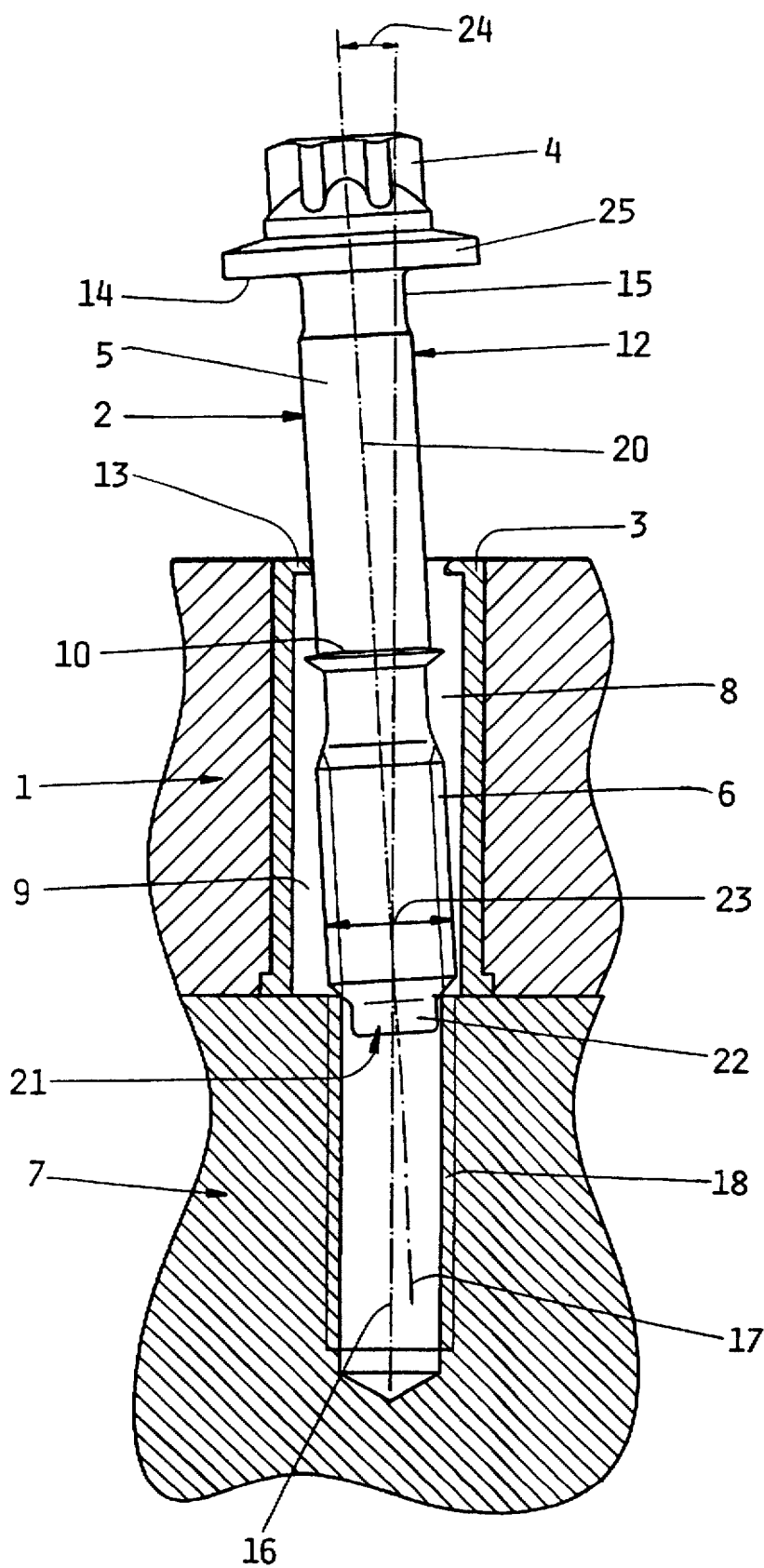
FIG. 1, a partial cross-sectional view of an assembly unit according to the invention, mounted on a machine part, in which there is a substantial axis offset, a screw being in a position corresponding to the beginning of a screwing-in operation.
Figure 2:
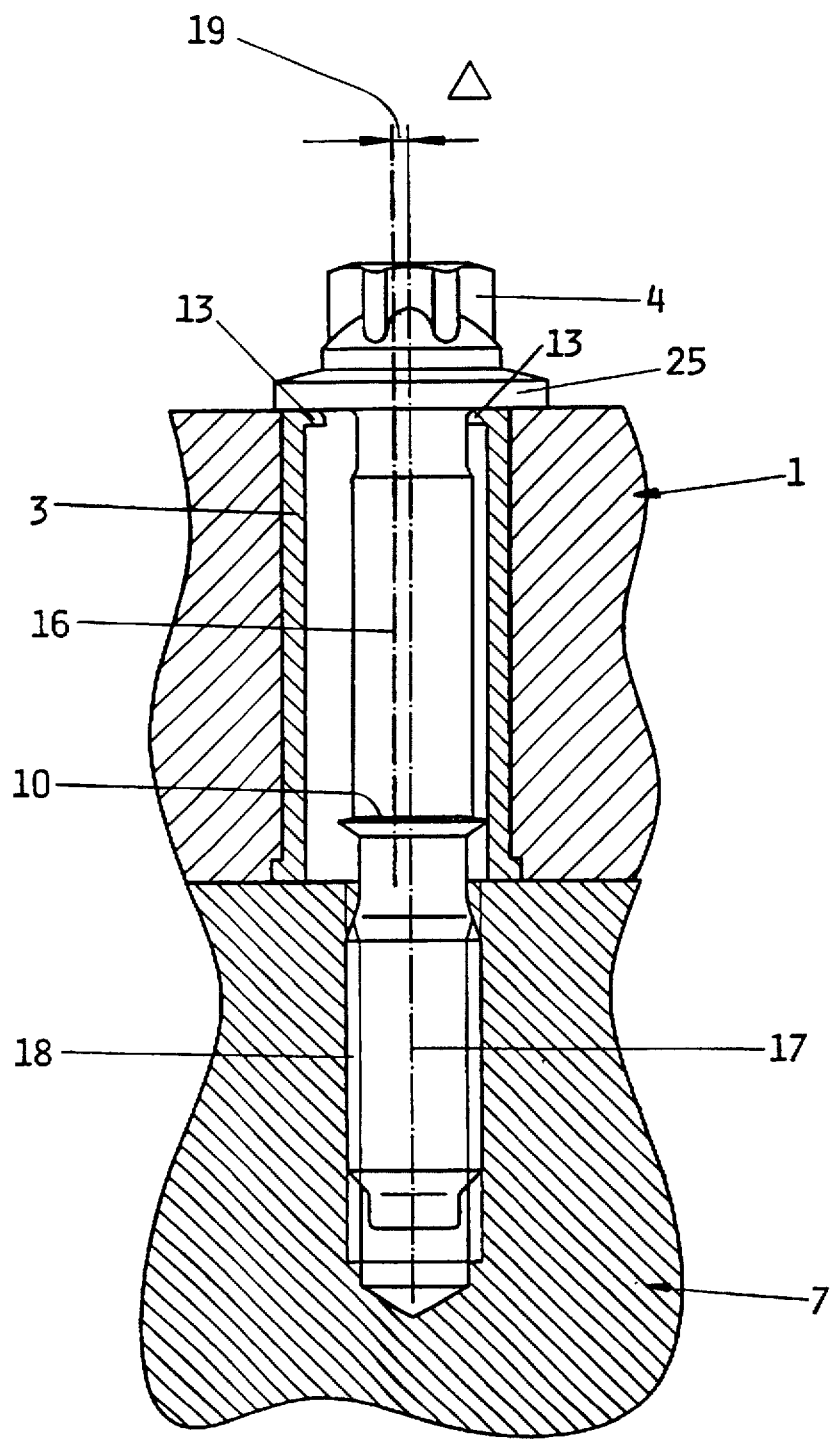
FIG. 2, a partial cross-sectional view analogous to FIG. 1, the screw being shown in its final assembly position.
Figure 4:
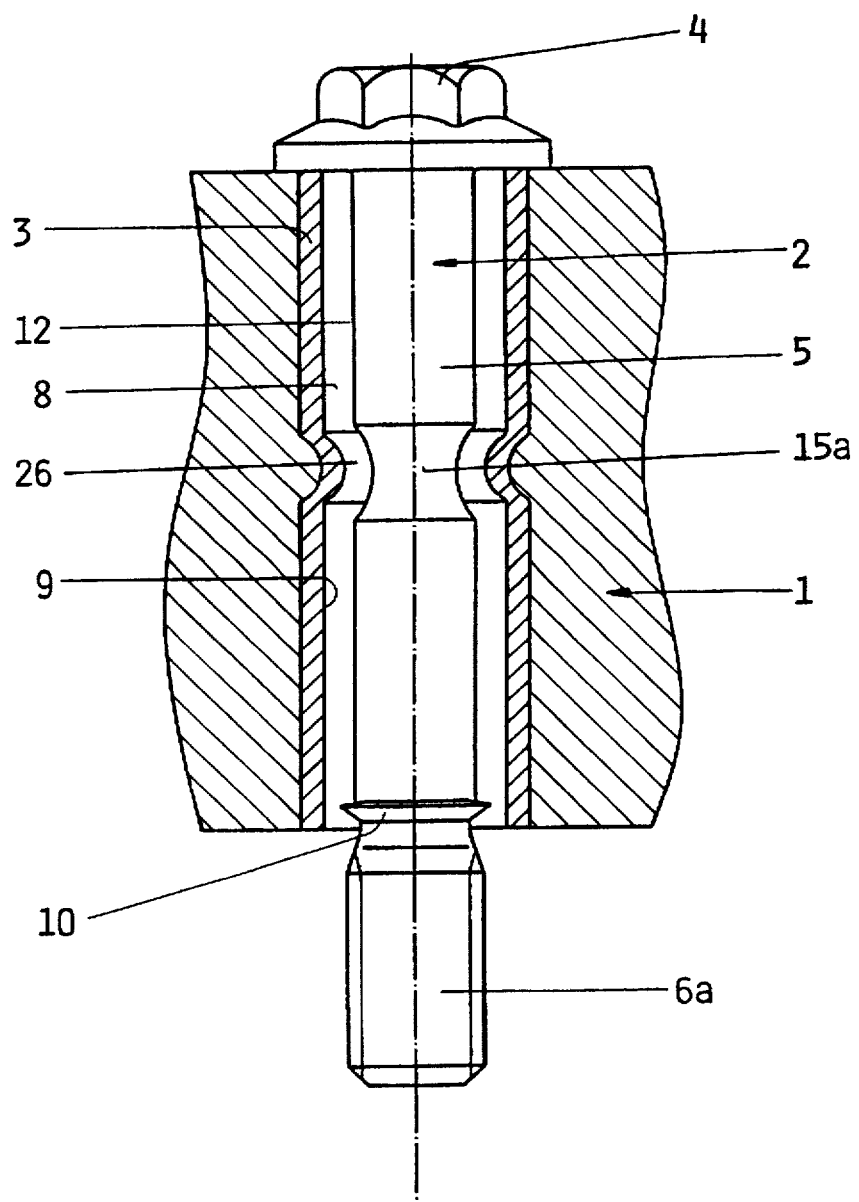
FIG. 4, a partial cross-sectional view similar to FIG. 2 showing yet another embodiment of an assembly unit according to the invention.

An assembly unit according to the invention, in the exemplary embodiments shown in FIGS. 1, 2 and 4, includes three parts, namely a housing cap 1 designated generally as an assembly element, a screw 2 or in general terms a fastening element, and a sleevelike retaining part, primarily a sleeve 3. The screw 2 has a head 4 for actuating the fastening thereof. The head 4 is adjoined by the screw shaft 5, on the end of the screw remote from the head, there is provided a screw thread 6. The screw 2 is used to fasten the housing cap 1 to a housing or machine part 7, or the like. The sleeve 3 rests in a through bore of the housing cap 1 and forms a through hole 8 into which the screw shaft 5 can be introduced. In FIG. 1, the screw is shown in tis initial position, that is, before the screwing in operation.

An annular protrusion 10 is formed on the shaft region that adjoins the screw thread 6 toward the head; this protrusion extends radially outward from the outer circumferential surface of the shaft. The outer diameter of the annular protrusion 10 is greater than the diameter of the shaft region, which forms an undercut region 12, located between the annular protrusion and the head 4. In the preassembly state of FIG. 1 and in the final assembled state of FIG. 2, at least one counterpart back-engagement part, which protrudes radially inward from the hole wall 9, protrudes into the undercut region 12. In the present exemplary embodiment, the back-engagement part is disposed by a plurality of fastening protrusions 13 on the end of the sleeve 3 toward the head 4. The length of the undercut region 12 or the distance between the annular protrusion 10 and the head 4, or its bearing face 14 on its underside, essentially defines the maximum displacement length of the screw 2. The shaft region immediately adjoining the bearing face 14 of the head has a constriction 15, for instance in the form of an annular groove formed by rolling to form an indentation. This constriction, in the final assembled state of FIG. 2, is disposed radially adjacent to the fastening protrusions 13.

The mounting of an assembly unit according to the invention on a machine part 7 will be described below; there is an axial offset 19 between the axis 16 of the through hole 8 and the nut thread axis 17. If such an offset exists, the screw 2 must necessarily be turned in the nut thread 18 with an alignment 20 that is inclined relative to the nut thread axis 17. To make this turning easier, the shaft end 21 of the screw 2 has a locator tip 22 with an effective diameter that is reduced compared with the thread diameter 23. The locating tip may also be embodied as a cone, taper, truncated cone or the like. The particular embodiment need merely assure that even if there is a relatively large axial offset 19 between the hole axis 16 and the nut thread axis 17, it is possible for the screw end with its screw thread to find the nut thread 18 and engage it. As long as no initial stress is exerted on the screw 2, there is sufficient thread play between the screw thread 6 and the nut thread 18. Because of this play, a sufficiently inclined position or inclined alignment 20 of the screw by an angle 24, for instance, is assured. A prestressing force does not build up until after the screw head 4 or its bearing face 14, which is formed by the underside of a bearing flange 25, meets the housing cap 1. Only from that moment on is the possibility of the tilting or inclined position (angle 24) of the screw 2 relative to the nut thread axis 17 absent. In the stage of fastening shown in FIG. 2, the screw 2 is oriented coaxially to the nut thread axis 17 and thus axially parallel to the hole axis 16. In conventional screws, this alignment or swiveling motion, which as it were cancels out the angle 24, is limited by the meeting of the shaft circumference with a fastening protrusion 13. In many cases, an axially parallel alignment of the screw is therefore possible only if the fastening protrusion cooperating with the shaft circumference becomes deformed. The danger then is that the screw shaft will be damaged. According to the invention, this danger is considerably reduced by the fact that the constriction 15 allows a greater swiveling or aligning motion of the screw 2 than is the case in conventional assembly units. The cross-sectional shape of the constriction 15 is expediently such that it can receive an entire fastening protrusion 13 inside itself. This is advantageous whenever the sleeve 3 widens conically toward its end away from the head. The lateral offset of the screw 2 inside the through hole 8 is then limited practically only by the outer circumference of the annular protrusion 10. To reduce the extent of this limitation, it is conceivable for the sleeve 3 or quite generally a through hole 8 to be embodied conically, so that it widens toward the machine part 7. It is also conceivable to dispense with an annular protrusion 10 entirely. In that case, the screw thread 6 itself acts as a back-engagement part, which cooperates with the fastening protrusions 13 to form a captive retainer.

Figure 3:
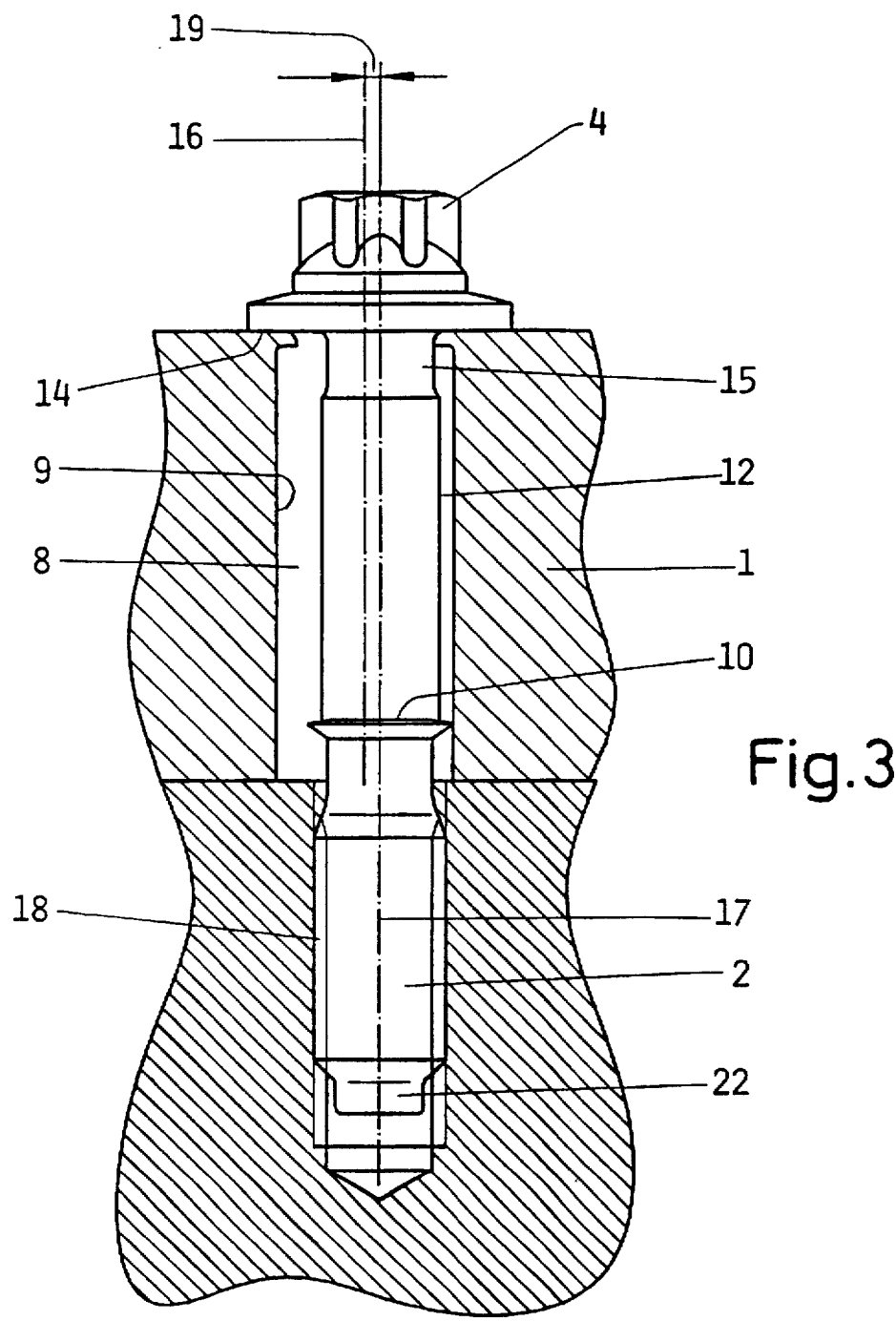
FIG. 3, a partial cross-sectional view, similar to FIG. 2 showing a further embodiment of an assembly unit according to the invention.

In the exemplary embodiment shown in FIG. 3, the assembly unit now comprises only two parts, namely the screw 2 and the housing cap 1. The through hole 8 here is not formed by a sleeve but rather is made directly in the housing cap, or in a mounting flange provided on it. Otherwise, the assembly unit shown in FIG. 3 functions the same as that described above.

In the exemplary embodiments described thus far, the fastening protrusions 13 are disposed on the end of the sleeve 3 or through bore 8 (in the case of FIG. 3) on the end toward the housing. The advantage of such an arrangement is primarily a long displacement length of the screw 2. Often, however, a long displacement length is not even needed. This is the case for instance with screws having a relatively short screw thread 6a. The back-engagement part cooperating with the annular protrusion 10 on the screw shaft 5, or with the screw thread 6a thereof, can then be disposed at a distance from the end toward the head of the sleeve 3 or the through hole 8. Accordingly, the constriction 15a cooperating with the back-engagement part is likewise disposed at a distance from the head 4. In any case, the mutual positioning is such that the back-engagement part in the through hole 8, in the final assembled state, is disposed radially adjacent to the constriction 15a. The back-engagement part on the sleeve 3 or on the wall 9 of the through hole 8 can also—as shown in FIG. 4—be embodied in the form of a radially inward—protruding annular flange 26.

Figure 5:
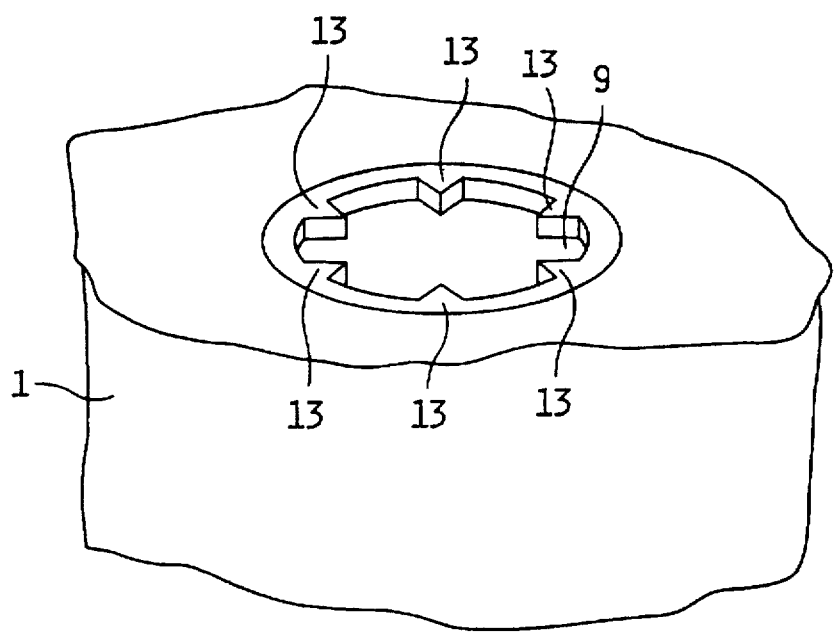
FIG. 5 shows a schematic, perspective view of a portion of an assembly element having a plurality of fastening protrusions.

FIG. 5 shows a schematic, perspective view of a portion of an assembly element 1 having a plurality of fastening protrusions 13 distributed uniformly over a circumference of the wall 9.

I claim:

1. An assembly unit comprising:

an assembly element defining a through hole therein and having:

a wall bounding the through hole; and a counterpart back engagement part protruding radially inwardly from the wall and into the through hole; and a fastening element configured to be inserted into the through hole of the assembly element for assuming an initial position and a final assembly position therein, the fastening element including:

a head for actuating a fastening of the fastening element for placing the fastening element in its final assembly position for fastening the assembly element to a workpiece;

a shaft disposed adjacent the head for resting with radial play in the through hole of the assembly element, the shaft resting entirely in the through hole of the assembly element in the final assembly position of the fastening element; and a back engagement part disposed on the shaft and having a cross section in a plane perpendicular to a longitudinal axis of the shaft which protrudes beyond a cross section of the shaft in the plane;

wherein:

the shaft defines an undercut region between the head and the back engagement part of the fastening element, the undercut region defining a constriction therein positioned such that, in the final assembly position of the fastening element, the constriction is disposed, in a radial direction, adjacent the counterpart back engagement part of the assembly element; and when the shaft rests in the through hole, the counterpart back engagement protrudes toward the undercut region of the shaft and cooperates with the back engagement part to captively retain the fastening element in the through hole.

2. The assembly unit according to claim 1, wherein the workpiece is a machine part.

3. The assembly unit according to claim 1, wherein the constriction has a cross section in the plane perpendicular to the longitudinal axis of the shaft which is configured for receiving an entirety of the counterpart back engagement part therein.

4. The assembly unit according to claim 1, wherein the assembly element further comprises a sleeve resting in the through hole thereof, the sleeve having an inside jacket face forming the wall bounding the through hole.

5. The assembly unit according to claim 1, wherein the back engagement part is an annular protrusion protruding radially outwardly from a circumference of the shaft.

6. The assembly unit according to claim 1, wherein the fastening element is a screw having a screw thread thereon.

7. The assembly unit according to claim 6, wherein the screw thread is the back engagement part.

8. The assembly unit according to claim 1, wherein the counterpart back engagement part comprises a plurality of fastening protrusions distributed over a circumference of the wall bounding the through hole.

9. The assembly unit according to claim 8, wherein the fastening protrusions are distributed uniformly over the circumference of the wall bounding the through hole.

10. The assembly unit according to claim 1, wherein the counterpart back engagement part is an annular protrusion protruding radially inwardly from the wall bounding the through hole.

* * * * *